(12) United States Patent
Deshmukh et al.

(10) Patent No.: US 7,539,702 B2
(45) Date of Patent: *May 26, 2009

(54) PRE-SUMMARIZATION AND ANALYSIS OF RESULTS GENERATED BY AN AGENT

(75) Inventors: Vijay Deshmukh, Mountain View, CA (US); Benjamin Swartzlander, San Jose, CA (US)

(73) Assignee: Netapp, Inc., Sunnyvale, CA (US)

( * ) Notice: Subject to any disclaimer, the term of this patent is extended or adjusted under 35 U.S.C. 154(b) by 499 days.

This patent is subject to a terminal disclaimer.

(21) Appl. No.: 10/798,990

(22) Filed: Mar. 12, 2004

(65) Prior Publication Data

US 2005/0203907 A1  Sep. 15, 2005

(51) Int. Cl.
*G06F 17/30* (2006.01)

(52) U.S. Cl. .......................... 707/200; 707/1

(58) Field of Classification Search ............... 707/2, 707/200, 202, 203, 204, 205; 709/223; 711/114; 345/335, 356

See application file for complete search history.

(56) References Cited

U.S. PATENT DOCUMENTS

| | | | |
|---|---|---|---|
| 5,146,540 A | 9/1992 | Natarajan | |
| 5,313,631 A * | 5/1994 | Kao | 707/204 |
| 5,970,494 A | 10/1999 | Velissaropoulos et al. | |
| 5,987,506 A | 11/1999 | Carter et al. | |
| 5,999,930 A | 12/1999 | Wolff | |
| 6,052,724 A | 4/2000 | Willie et al. | |
| 6,138,249 A | 10/2000 | Nolet | |
| 6,199,082 B1 | 3/2001 | Ferrel et al. | |
| 6,292,797 B1 | 9/2001 | Tuzhilin et al. | |
| 6,298,349 B1 | 10/2001 | Toyoshima et al. | |
| 6,311,194 B1 * | 10/2001 | Sheth et al. | 715/505 |
| 6,430,611 B1 * | 8/2002 | Kita et al. | 709/223 |
| 6,519,612 B1 | 2/2003 | Howard et al. | |
| 6,553,377 B1 * | 4/2003 | Eschelbeck et al. | 707/10 |
| 6,563,521 B1 | 5/2003 | Perttunen | |
| 6,571,257 B1 * | 5/2003 | Duggan et al. | 707/202 |
| 6,578,048 B1 | 6/2003 | Mauldin | |
| 6,625,615 B2 | 9/2003 | Shi et al. | |
| 6,725,261 B1 | 4/2004 | Novaes et al. | |
| 6,754,890 B1 | 6/2004 | Berry | |

(Continued)

FOREIGN PATENT DOCUMENTS

WO  WO 02/25870  3/2002

(Continued)

OTHER PUBLICATIONS

David Marshall, Threads: Basic Theory and Libraries, May 1999, pp. 2-32.*

*Primary Examiner*—Yicun Wu
(74) *Attorney, Agent, or Firm*—Perkins Coie LLP (57) ABSTRACT

According to an embodiment of the invention, an agent scans a storage server, and collects information about files stored on the storage server. The agent then summarizes the information into a summary, and stores the summary on a database server. The summaries can be accessed by a system administrator using a graphical user interface (GUI). The summaries contain information about the use of the storage server, and highlight potential problem areas. By having an agent, rather than a multi-appliance management application (MMA) scan the storage server and create the summary, the MMA is able to perform other tasks.

36 Claims, 6 Drawing Sheets

U.S. PATENT DOCUMENTS

| | | | |
|---|---|---|---|
| 6,801,903 B2 * | 10/2004 | Brown et al. | 707/2 |
| 6,857,012 B2 | 2/2005 | Sim et al. | |
| 6,915,409 B1 | 7/2005 | Peterson | |
| 6,922,708 B1 | 7/2005 | Sedlar | |
| 6,947,940 B2 | 9/2005 | Anderson et al. | |
| 6,973,577 B1 | 12/2005 | Kouznetsov | |
| 7,013,323 B1 | 3/2006 | Thomas et al. | |
| 7,024,427 B2 | 4/2006 | Bobbitt et al. | |
| 7,054,927 B2 | 5/2006 | Ulrich et al. | |
| 7,080,277 B2 | 7/2006 | Anna et al. | |
| 7,089,313 B2 | 8/2006 | Lee | |
| 7,120,757 B2 | 10/2006 | Tsuge | |
| 7,167,915 B2 | 1/2007 | Bendich et al. | |
| 7,275,063 B2 | 9/2007 | Horn | |
| 2002/0049782 A1 | 4/2002 | Herzenberg et al. | |
| 2002/0147805 A1 | 10/2002 | Leshem et al. | |
| 2002/0175938 A1 | 11/2002 | Hackworth | |
| 2003/0046369 A1 | 3/2003 | Sim et al. | |
| 2003/0115218 A1 | 6/2003 | Bobbitt et al. | |
| 2004/0078461 A1 | 4/2004 | Bendich et al. | |
| 2004/0098363 A1 | 5/2004 | Anglin et al. | |
| 2004/0098383 A1 | 5/2004 | Tabellion et al. | |
| 2004/0122936 A1 | 6/2004 | Mizelle et al. | |
| 2004/0133606 A1 | 7/2004 | Miloushev et al. | |
| 2004/0143608 A1 | 7/2004 | Nakano et al. | |
| 2004/0181605 A1 | 9/2004 | Nakatani et al. | |
| 2004/0196970 A1 | 10/2004 | Cole | |
| 2004/0205143 A1 | 10/2004 | Uemura | |
| 2005/0050269 A1 * | 3/2005 | Horn | 711/114 |
| 2005/0086192 A1 | 4/2005 | Kodama | |
| 2005/0102289 A1 | 5/2005 | Sonoda et al. | |
| 2005/0108474 A1 | 5/2005 | Zhang et al. | |
| 2005/0108484 A1 | 5/2005 | Park | |
| 2005/0166094 A1 | 7/2005 | Blackwell et al. | |
| 2006/0041656 A1 | 2/2006 | Li et al. | |

FOREIGN PATENT DOCUMENTS

| | | | |
|---|---|---|---|
| WO | WO 02/25870 A1 | 3/2002 | |

* cited by examiner

| | Name | Time Last Accessed |
|---|---|---|
| Least Recently Accessed | /u/users/b/baker/banner.jpg | 02.04.1999 2:48am |
| | Name | Size |
| Largest | /u/users/j/jones/bigmovie.mpg | 2.7GB |
| | Name | Size |
| Smallest | /u/users/r/roberts/go.txt | 27 bytes |
| | Name | Date |
| Oldest | /u/oldfiles/DOS/command.com | 01.01.1980 12:01am |

| Directory Name 502 | Number of Files 504 | Total Size 506 | Average Access Time 508 |
|---|---|---|---|
| /u/ | 2142 | 873MB | 02.06.04 12:37 pm |
| /u/users/ | 18 | 47MB | 03.01.04 3:17 pm |
| /u/administrators/ | 14,312 | 25.3GB | 03.02.04 1:26 pm |
| /u/users/a/ | 42 | 1.2MB | 08.06.03 3:18 am |
| /u/users/a/Aaron | 4,362 | 6.6GB | 06.08.02 7:12 pm |

PRE-SUMMARIZATION AND ANALYSIS OF RESULTS GENERATED BY AN AGENT

FIELD OF THE INVENTION

At least one embodiment of the present invention pertains to networked storage systems, and more particularly to a method and apparatus for collecting and reporting data pertaining to files stored on a storage server.

BACKGROUND

A file server is a type of storage server which operates on behalf of one or more clients to store and manage shared files in a set of mass storage devices, such as magnetic or optical storage based disks. The mass storage devices are typically organized as one or more groups of Redundant Array of Independent (or Inexpensive) Disks (RAID). One configuration in which file servers can be used is a network attached storage (NAS) configuration. In a NAS configuration, a file server can be implemented in the form of an appliance, called a filer, that attaches to a network, such as a local area network (LAN) or a corporate intranet. An example of such an appliance is any of the NetApp Filer products made by Network Appliance, Inc. in Sunnyvale, Calif.

A filer may be connected to a network, and may serve as a storage device for several users, or clients, of the network. For example, the filer may store user directories and files for a corporate or other network, such as a LAN or a wide area network (WAN). Users of the network can be assigned an individual directory in which they can store personal files. A user's directory can then be accessed from computers connected to the network.

A system administrator can maintain the filer, ensuring that the filer continues to have adequate free space, that certain users are not monopolizing storage on the filer, etc. A Multi-Appliance Management Application (MMA) can be used to monitor the storage on the filer. An example of such an MMA is the Data Fabric Monitor (DFM) products made by Network Appliance, Inc. in Sunnyvale, Calif. The MMA may provide a Graphical User Interface (GUI) that allows the administrator to more easily observe the condition of the filer.

The MMA needs to collect information about files stored on the filer to report back to the administrator. This typically involves a scan, also referred to as a "file walk" of storage on the filer. During the file walk, the MMA can determine characteristics of files stored on the filer, as well as a basic structure, or directory tree, of the directories stored thereon. These results can be accumulated, sorted, and stored in a database, where the administrator can later access them. The MMA may also summarize the results of the file walk so they are more easily readable and understood by the administrator.

On a large system, the file walk can be a very intensive process. Additionally, the results of a typical file walk can themselves be very large and difficult to parse. An MMA typically has many tasks to perform, and generally should be available for the administrator. What is needed is a way to reduce the load on an MMA while still maintaining and monitoring attached appliances.

SUMMARY OF THE INVENTION

A method for collecting information from a storage server is disclosed. An agent scans a storage server. Information regarding files stored on the storage server is collected. The agent then summarizes the information, creating a summary. The summary is stored on a database server.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Described herein are methods and apparatuses for Pre-summarization and Analysis of Results Generated by an Agent. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

According to an embodiment of the invention, an agent is coupled to a storage server through a network. The storage server is monitored by a Multi-Appliance Management Application (MMA). The agent performs a scan, or a "file walk," of the storage server and returns the results to the MMA through the network. The results can then be stored on a database server. The agent is responsible for collecting information about files stored on the storage server. The agent is also responsible for generating summaries, including tables and histograms, of relevant and requested information about the files on the server before the information is transferred to the MMA. In this way, the agent pre-summarizes the information before it is transmitted to the MMA. As a result, the MMA is not burdened with the task of summarizing the information, and the summaries are available to an administrator as soon as they are requested.

The MMA is generally a single server that is used to allow a system administrator to monitor a storage or file server. When a large storage server is monitored, the MMA may have difficulty performing its monitoring duties and a file walk at the same time. In fact, the file walk may make the MMA inaccessible to the system administrator, and the MMA may become a bottleneck, since it may be incapable of performing the file walk in a reasonable amount of time. According to an embodiment of the invention, independent agents are used to perform the file walk, to reduce the load on the MMA. At a later time, the system administrator may want summarized information about the file server. Instead of having the MMA summarize the information, the summaries are compiled by the agent during the file walk, and stored on the database.

Figure 1:
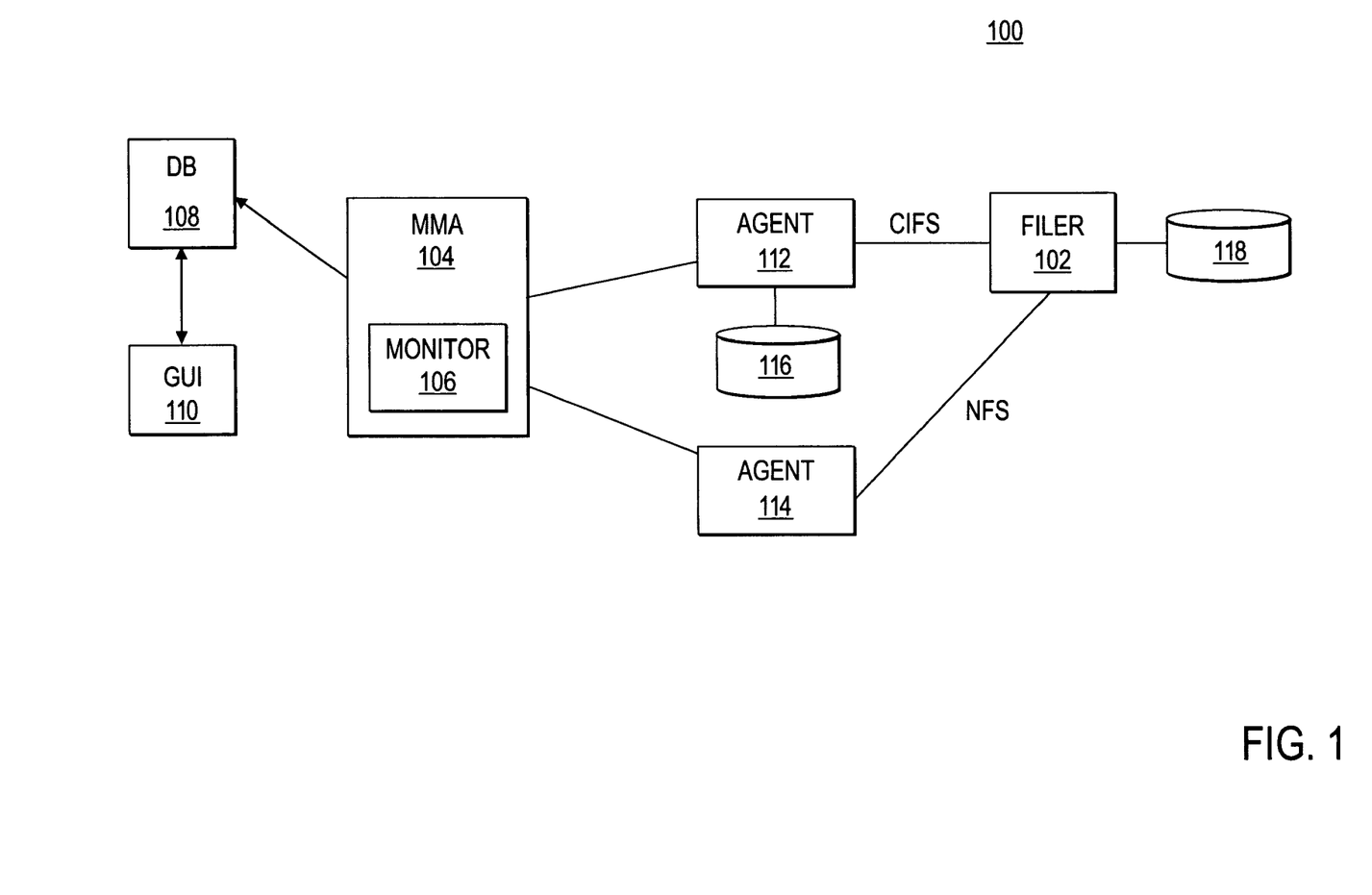
FIG. 1 illustrates a monitoring system for a storage server.

FIG. 1 illustrates a monitoring system for a storage server. The system 100 includes a filer 102, an MMA 104 including a monitor 106, a database 108, a graphical user interface (GUI) 110, and two agents 112 and 114. The agents 112 and 114 can perform a file walk of the filer 102 for the MMA 104. An agent may be an independent server that is attached to the network and is dedicated to performing file walks. By having an agent perform this task rather than having the MMA do it, the MMA can save its resources for other tasks, such as monitoring current activity on the filer 102 using the monitor 106. Ultimately, one goal is to minimize the amount of work the MMA is required to do. Additionally, multiple agents can be added to perform a complete file walk in less time if necessary.

According to one embodiment of the invention, the agents 112 and 114 may use a file system different from the one used by the filer 102. For example, the agent 112 uses the Common Internet File System (CIFS), while the agent 114 uses the Network File System (NFS). Here, either agent 112 or 114 is able to perform the file walk of the filer 102, regardless of the file system used by the filer 102. The agent 112 also has storage 116 to store the results of a file walk while the walk is occurring and before they are transferred to the MMA 104. The agent 114 may also have attached storage for this purpose.

The filer 102 is generally attached to a volume 118. The volume 118 may include one or more physical hard drives or removable storage drives that comprise the storage for the filer 102. For example, the volume 118 may comprise a RAID structure. The filer 102 may also be connected to other volumes that comprise storage. A file walk generally scans all files stored on the entire volume 118, regardless of whether all of the files are stored on the same physical drive. Further, although the volume 118 may contain several separate physical drives, the volume 118 may appear and function as a single entity.

The results of a file walk may be transferred to and stored on the database server 108 after the file walk is complete. The database server 108 can then be accessed by the GUI 110, so that an administrator can search the results of the file walk. The GUI 110 may allow the administrator to easily parse the results of a specific file walk, including allowing the administrator to monitor the total size of files stored on the filer, the size of particular directories and their subdirectories, the parents of specific directories, etc. These queries will be discussed in more detail below. The file walk may also collect statistics about the files on the filer, such as the total size of files, the most accessed files, the types of files being stored, etc. According to one embodiment, the GUI 110 may be a web-based Java application.

According to an embodiment of the invention, the summary is written to the database server 108 as a table or a histogram. The summary may then be accessed through a Java applet using a web browser such as Internet Explorer or Netscape. In another embodiment, the summaries are accessed using other programs. Although tables and histograms are shown here, it is understood that any appropriate manner of relaying the summary data to the administrator may be used.

Figure 2:
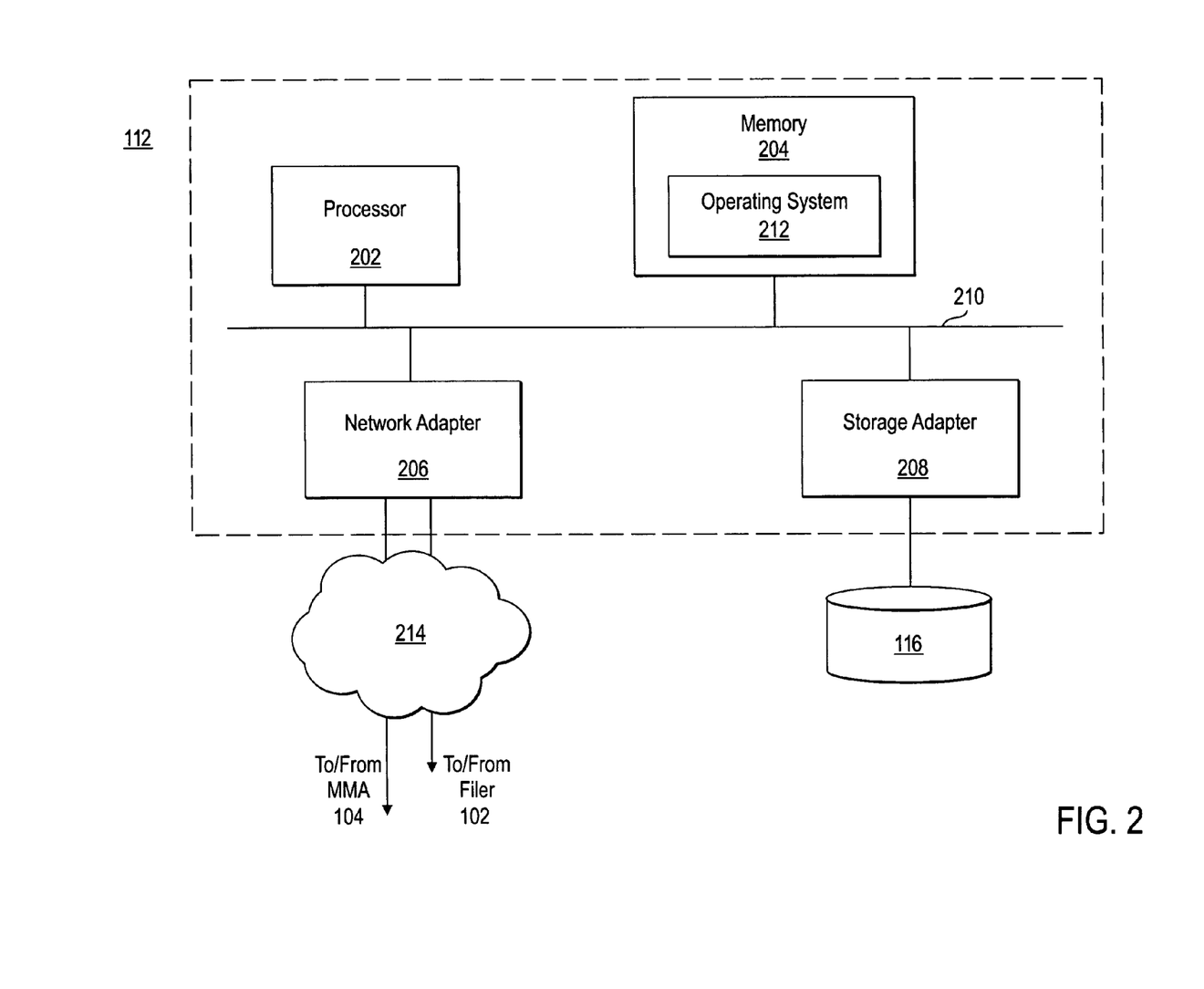
FIG. 2 illustrates a block diagram of an agent.

FIG. 2 illustrates a block diagram of an agent. The agent 112 includes a processor 202, a memory 204, a network adapter 206, and a storage adapter 208. These components are linked through a bus 210. The agent 112, as shown in FIG. 2, is typical of a network server or appliance, and it is understood that various different configurations may be used in its place. The agent 114 may be similar.

The processor 202 may be any appropriate microprocessor or central processing unit (CPU), such as those manufactured by Intel or Motorola. The memory 204 may include a main random access memory (RAM), as well as other memories including read only memories (ROM), flash memories, etc. The operating system 212 is stored in the memory 212 while the agent 112 is operating. The operating system includes the file system, and may be any operating system, such as a Unix or Windows based system. The network adapter 206 allows the agent 112 to communicate with remote computers over the network 214. Here, the agent 112 will be collecting data from the filer 102 and sending data to the MMA 104. The storage adapter 208 allows the agent 112 to communicate with the storage 116 and other external storage.

Figure 3:
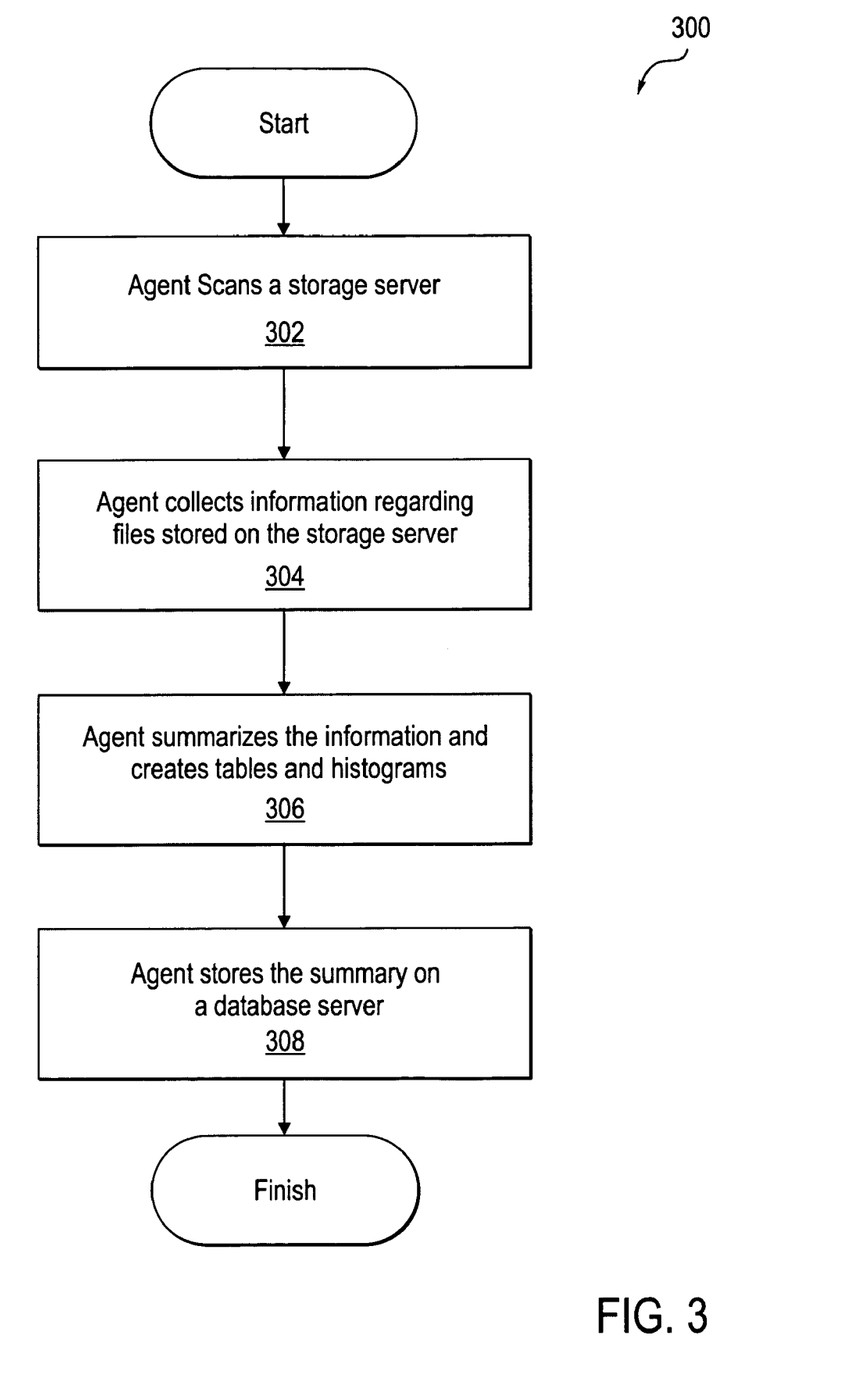
FIG. 3 is a flowchart illustrating a process for pre-summarizing and analyzing results generated by an agent.

FIG. 3 is a flowchart illustrating a process for pre summarizing and analyzing results generated by an agent. In block 302, an agent 112 scans a storage server, such as a filer 102. In one embodiment of the invention, many agents may scan different sections of the volume 118. The MMA 104 may determine how to divide the file walking task among the various agents. In one embodiment, for example, the MMA 104 may assign certain directories within the root directory to a first agent, while the other directories are assigned to a second agent. The MMA 104 may use as many agents as necessary to perform the file walk. For example, when scanning a very large volume 118, several agents may be necessary to perform the file walk in an acceptable time. As a further example, the administrator may want to perform the file walk very quickly, and may assign additional agents to expedite the task.

During the file walk scanning, in block 304, the agent 112 collects information about files stored on the volume 118. This information may include file names, directory names, file sizes, dates of creation, etc. The file walk may be performed by one or more 'threads.' A thread may be a program capable of operating independently of other programs. Using a single threaded system, the agent scans directories found on the volume 118 with a single thread. A multi-threaded system may include two or more threads. A file thread can be used to scan and determine characteristics of files, while a directory thread can be used to determine the contents of directories. A directory queue and a file queue are also established. The directory thread examines the directory found at the top of the directory queue, and places that directory's contents into the file queue. The file thread then examines the members of the file queue, placing directories in the directory queue and examining files. The file thread may collect information including the name of the file, the size of the file, the location of the file, the type of file, the time of creation of the file, the time of last access of the file, and the owner of the file. This information will be used to create the tables and histograms in FIGS. 4-7. The directory thread may also report information about the directory structure on the volume 118.

In block 306, the agent summarizes the collected information and creates tables and histograms. Examples of the summarized information will be shown in FIGS. 4-7. There are several types of summaries that the agent can create. For example, the agent can create a table of interesting files, a table of directory or user information, histograms listing the types of files stored, etc. In block 308, the summarized information is stored on the database server 108. The GUI 110 may be used to later access the stored information.

Figure 4:
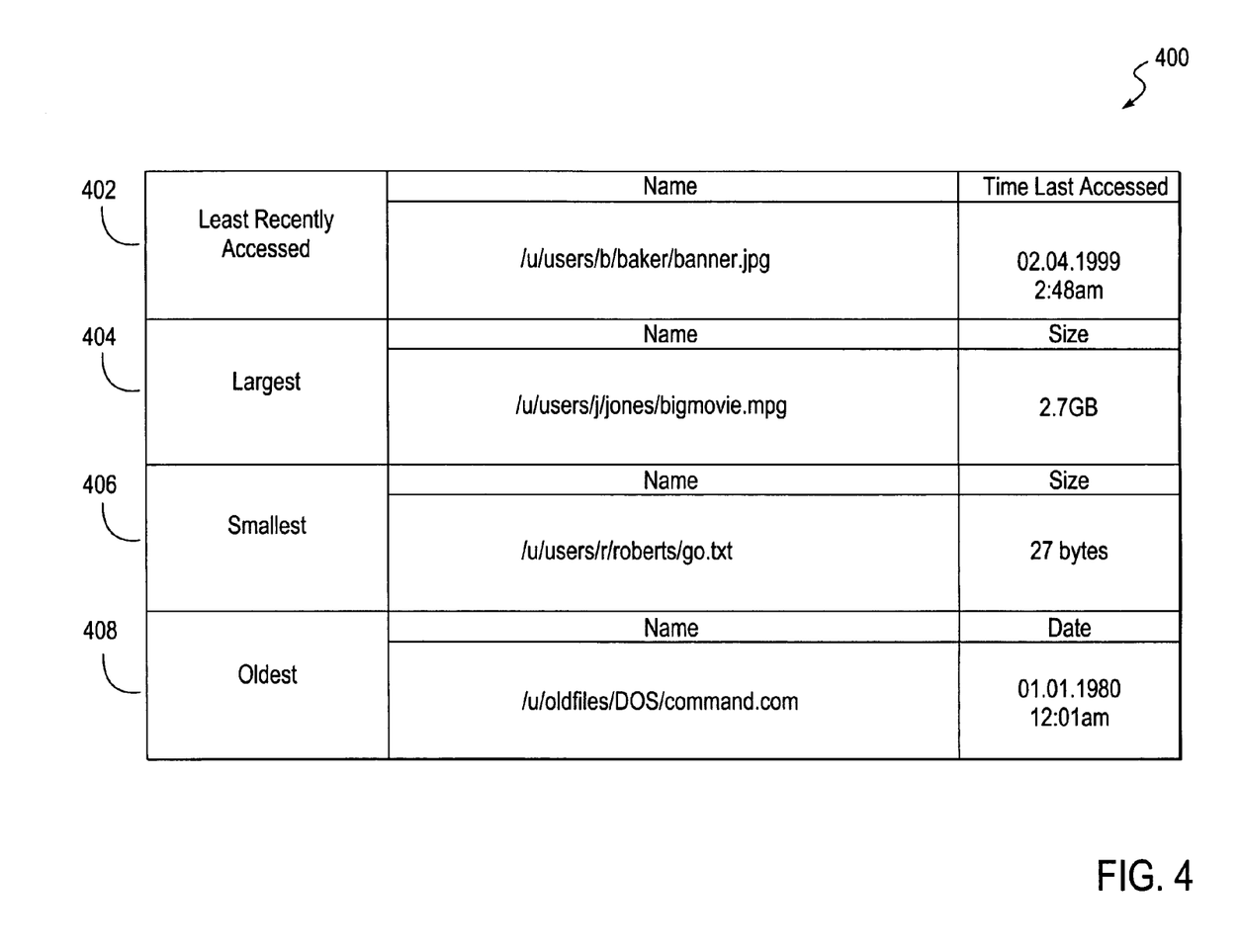
FIG. 4 illustrates a table displaying a list of interesting files.

FIG. 4 illustrates a table displaying a list of interesting files. While collecting the file data, the agent 112 may keep track of certain statistics about the files on the storage server 102. For example, the table 400 includes a list of several files that the agent 112 has tracked. The agent 112 has been instructed to keep track of the largest file found, the smallest file found, the least recently accessed file found, and the oldest file found. Although these types of files are listed, it is understood that any characteristic may be tracked. For example, the agent 112 may also track the most accessed file, the directory with the largest number of files, etc. The table 400 may also include the top 'n' files of each type, where 'n' is a number specified by the administrator or the MMA 104. The table 400 may be configured so that the GUI 110 can access and display its contents.

Summaries are useful for a number of reasons. The summaries can give an administrator a quick overview of the operation of the filer 102. The summaries can also point out trouble spots or potential trouble spots. An administrator needs a quick and easy way to monitor a filer 102, and the summaries can be tailored to provide important information. Since the volume 118 may be very large, containing hundreds of thousands or millions of files, it may be impractical for the MMA 104 to summarize the file walk metadata. Therefore, the agents 112 and 114 can generate the summaries while the file walk is occurring. It is easy to add more agents if necessary to cope with the additional workload created by the generation of the summaries. By shifting the summarization task to the agents 112 and 114, the MMA 104 will be more responsive to the requests of the administrator.

A row 402 lists the name and last date of access of the least recently accessed file on the storage server 102. This information is useful if a system administrator is trying to determine whether there are any old or unused files on the volume 118. For example, if the least recently accessed file was accessed less than six months ago, the administrator may determine that no corrective action is necessary. However, as shown here, there is at least one file that has not been accessed for several years. The table 400 may be configured so that several other old files may also be listed. For example, the table may list any file that has not been accessed in the last year. The administrator can then make a determination about whether the file should be purged or retained. The administrator can determine what to do with these old files. For example, the administrator may delete them or move them to another storage server. In one embodiment, these actions are automated.

The row 404 lists the largest file found on the filer 102. This information may be useful to an administrator who needs to create or maintain free space on the server, and is looking for large files to remove. Here, a user is storing a very large movie file, which is occupying a sizeable percentage of the server's storage space. The administrator can target this file, deleting it if necessary. The administrator can also configure the agent 112 to include a list of several of the largest files found on the volume.

The row 406 lists the smallest file found. The row 408 lists the oldest file found. This information may be useful to an administrator trying to determine what type of usage occurring on the server. It is understood that other details may also be listed regarding the files on the volume 118. It is further understood that the GUI 110 may provide a customizable interface in which an administrator can specify what types of summaries and histograms will be provided.

Figure 5:
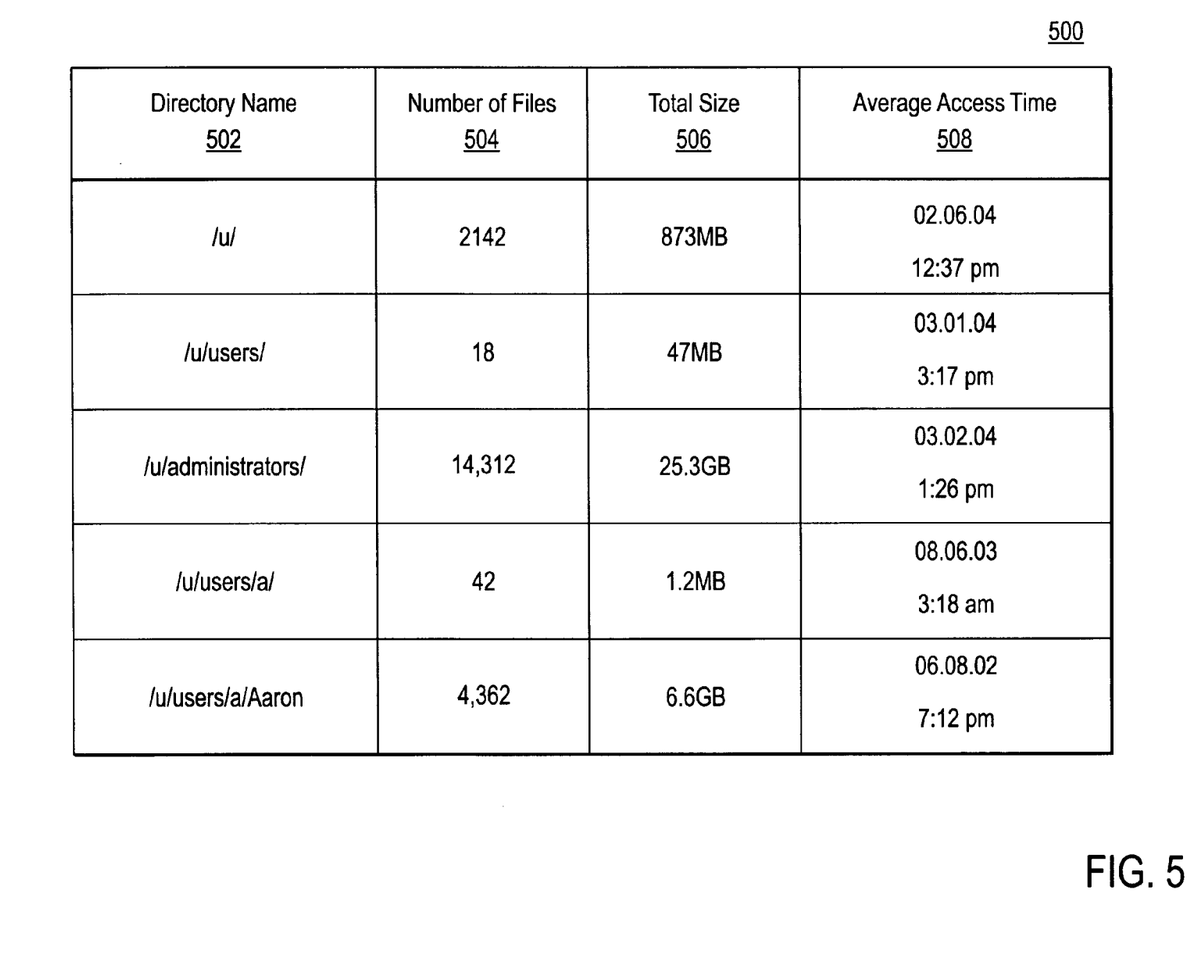
FIG. 5 illustrates a table listing information about directories on the server.

FIG. 5 illustrates a table listing information about directories on the server 102. The table 500 includes several columns, listing the directory name in the column 502, the number of files in the directory in the column 504, the total size of the files in the directory in the column 506, and the average time of the last access to files in the directory in the column 508. The agent 112 collects this information during the file walk, and compiles the table. The MMA 104, in many instances, does not have the resources to generate these tables or collect these results. This is especially true where there are several agents scanning a single storage server. Having the agents perform these tasks will save resources that the MMA 104 may require for other tasks.

The collected information about the directories on a storage server can be useful for several reasons. The administrator can find bottlenecks in the system, as well as directories that have an abnormally large number of files or total size. In other embodiments, another table, similar to the table 500 may be generated. This table may include cumulative statistics that list the total number of files in a directory, including the total statistics for all embedded directories found within that directory. For example, the column 506 may list the total size of all files in a directory and in the directory's subdirectories.

The column 508 lists the average last access time for the files located in the listed directory. The column 508 lists a time stamp, in other words, an average time during which all files in the directory were last accessed. For example, if a directory contained five files, one most recently accessed today, one yesterday, one two days ago, one three days ago, and the last four days ago, the average access time would be sometime two days ago. This is useful so that an administrator can easily determine how active the particular directory is, and whether there are a large number of files that are not being regularly accessed. For example, it appears that there are a number of stale files in the directory '/u/users/a/Aaron/' since the average access time is over eighteen months ago.

Figure 6:
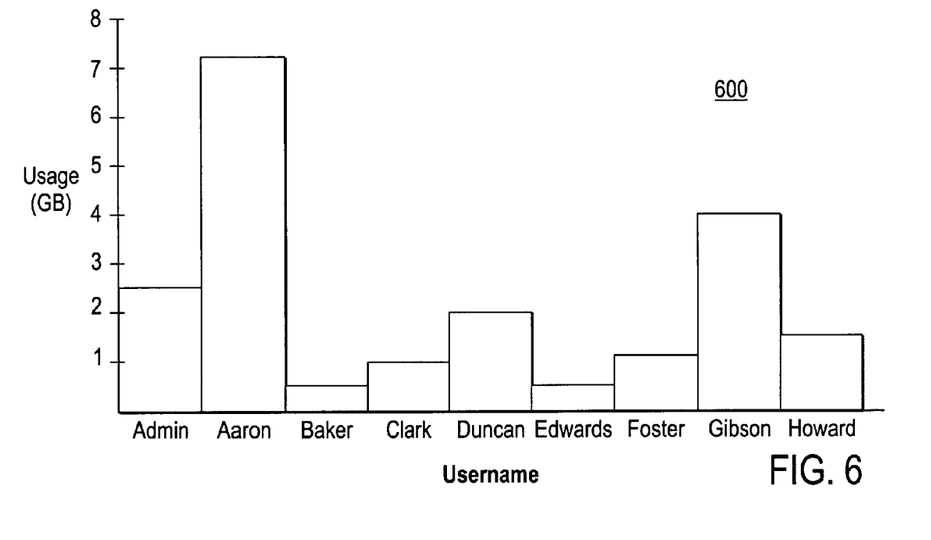
FIG. 6 illustrates a histogram showing server usage of certain users.

FIG. 6 illustrates a histogram showing server usage of certain users. The histogram 600 demonstrates how much space each user is occupying on the volume 118. An administrator can use this data to determine whether one user is occupying an abnormally large amount of space. In one embodiment, the MMA 104 can use this information to revoke the user's ability to store any more files. For example, the users 'Aaron' and 'Gibson' are using much more storage space than the other users. The administrator can target these users to increase the amount of free space on the server, if needed.

The histogram 600 may be personalized by the administrator. For example, in a system with many users, it may be difficult for the administrator to parse the histogram 600. Therefore, the histogram 600 may list the users with the highest usage first, or only those users that are using more than a specified amount of storage space. A histogram showing the usage of many users may allow an administrator to determine the approximate percentage of users that are using an abnormally large amount of server space. It is understood that the data represented in the histogram 600 may also be displayed in other forms, such as in table form.

Figure 7:
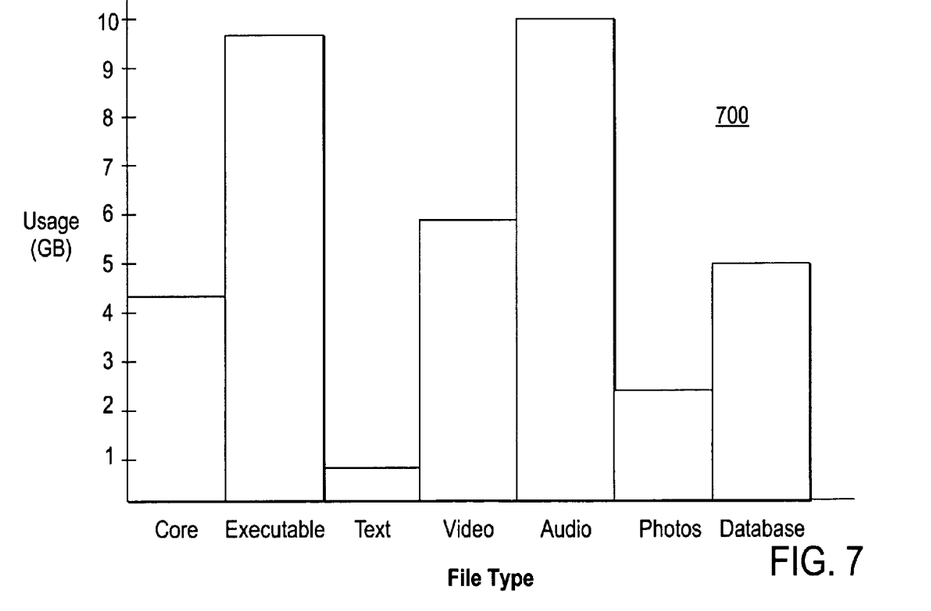
FIG. 7 illustrates a histogram showing the types of files stored on a server.

FIG. 7 illustrates a histogram showing the types of files stored on a server. The histogram 700 can be useful to determine the typical usage of the server, and to point out improper usage. The histogram indicates several different types of files, including core files, executable files, text files, video files, audio files, photos, and database files. In another embodiment, the types of files may be listed by a file extension or other file identifier. For example, the histogram 700 may include a category for those files having an '.mp3' extension if an administrator wants to determine the amount of system space used by these files. It is understood that many different types of files may be reported in the histogram 700. It is further understood that the amount of usage may be represented as a percentage of total storage space.

As can be seen from the histogram 700, there are approximately 10GB of audio files and 6GB of video files stored on the server. Depending on the use of the server, this may or may not be a problem. For example, the server may be a web server that hosts multimedia files. In this case, it would be appropriate to have this amount of media files compared to other files. However, if the server is a corporate server, it may be inappropriate for individual users to be stored video and audio files in their personal accounts. The histogram 700 can serve as an indication to the system administrator that action needs to be taken regarding these files. It is understood that an administrator may also specify that the file type is only displayed if the files of a specific type are occupying an abnormally large amount of space on the volume 118.

The techniques introduced above have been described in the context of a NAS environment. However, these techniques can also be applied in various other contexts. For example, the techniques introduced above can be applied in a storage area network (SAN) environment. A SAN is a highly efficient network of interconnected, shared storage devices. One difference between NAS and SAN is that in a SAN, the storage server (which may be an appliance) provides a remote host with block-level access to stored data, whereas in a NAS configuration, the storage server provides clients with file-level access to stored data. Thus, the techniques introduced above are not limited to use in a file server or in a NAS environment.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are accordingly to be regarded in an illustrative, rather than in a restrictive sense.

What is claimed is:

1. A machine implemented method for collecting information from a storage server managed by use of a multi-appliance management application (MMA), the method comprising:

dividing, by the MMA, data stored in the storage server into a plurality of sections;

assigning, by the MMA, the plurality of sections to a plurality of agents, wherein each of the plurality of agents is an independent system which is a separate device from the storage server and the MMA, and wherein each of the plurality of agents communicates with the storage server via a network;

using the plurality of agents to scan the plurality of sections and to collect information regarding files stored by the storage server;

summarizing the information and creating a summary by using the plurality of agents;

storing, by the plurality of agents, the summary on a database server; and outputting, by the MMA, the summary to a user interface.

2. The method of claim 1, further comprising analyzing the files and generating statistics regarding the files.

3. The method of claim 1, further comprising analyzing the files and generating a table and a histogram regarding the files.

4. The method of claim 2, wherein the statistics comprise a number of files, a size of files, and an average access time if files.

5. The method of claim 1, further comprising transferring the summary to the MMA before storing the summary on the database server.

6. The method of claim 3, further comprising accessing the table and the histogram using a graphical user interface (GUI).

7. The method of claim 6, wherein accessing further comprises accessing the table and the histogram over the Internet.

8. The method of claim 1, wherein collecting information comprises using a file thread to examine files and using a directory thread to examine directories.

9. A machine readable storage medium having stored thereon executable program code which, when executed, causes a machine to collect information from a storage server managed by a multi-appliance management application (MMA), the executable program code comprising:

program code for receiving, from the MMA, an assignment of a section of data stored in the storage server;

program code for scanning the section of data and collecting information regarding files stored by the storage server, wherein the storage server, the MMA, and the machine are separate devices, wherein the machine is an independent processing system which communicates with the storage server via a network;

program code for summarizing the information and creating a summary, and storing the summary on a database server; and program code for outputting, by the MMA, the summary in response to a user s request at the MMA.

10. The machine readable storage medium of claim 9, wherein the executable program code further comprises program code for analyzing the files and generating statistics regarding the files.

11. The machine readable storage medium of claim 9, wherein the executable program code further comprises program code for analyzing the files and generating a table and a histogram regarding the files.

12. The machine readable storage medium of claim 10, wherein the statistics comprise a number of files, a size of files, and an average access time of files.

13. The machine readable storage medium of claim 9, wherein the executable program code further comprises program code for transferring the summary to the MMA before storing the summary on the database server.

14. The machine readable storage medium of claim 9, wherein collecting information comprises using a file thread to examine files and using a directory thread to examine directories.

15. An apparatus comprising:

a multi-appliance management application (MMA) to manage a server coupled to a mass storage device and to divide data stored in the server into a plurality of sections;

an agent coupled to the server and the MMA via a network, the agent to scan one of the plurality of sections assigned by the MMA and to create a summary including cumulative statistics about data on the mass storage device, wherein the agent, the MMA, and the server are separate devices, wherein the agent is an independent processing system on the network; and a database server coupled to the MMA and the agent to store the summary, wherein the summary is used by the MMA for outputting to a user interface.

16. The apparatus of claim 15, further comprising a monitor coupled to the agent and the database server to display the summary.

17. The apparatus of claim 15, wherein the server is a file server.

18. The apparatus of claim 15, wherein the server has a first file system and the agent has a second file system, the first file system is different from the second file system.

19. The apparatus of claim 15, wherein the summary includes histogram information about file system usage by file types.

20. The apparatus of claim 17, wherein the file server includes files stored in directories.

21. The apparatus of claim 20, wherein the summary includes cumulative information about the directories.

22. A method for collecting information from a file server comprising:
- at a multi-appliance monitoring application (MMA), monitoring the file server and dividing data stored in the file server into the plurality of sections;
- at the MMA, instructing an agent to scan one of the plurality of sections, wherein said agent is an independent processing system which communicates with the file server via a network, and wherein said agent is configured to execute a machine implemented method comprising:
  - collecting information regarding files stored in the one of the plurality of sections;
  - summarizing the information and creating a summary; and
  - transmitting the summary to the MMA, and
- receiving the summary at the MMA, wherein the agent, the MMA, and the file server are separate devices.

23. The method of claim 22, wherein the summary includes statistics regarding the files and the file server.

24. The method of claim 23, wherein the statistics include a number of files, a size of files, and an average access time of files.

25. The method of claim 22, wherein storing the summary further comprises storing the summary in a table.

26. The method of claim 22, wherein storing the summary further comprises storing the summary in a histogram.

27. A method for offloading tasks from a management server that manages a storage server, the method comprising:
- using an agent in place of the management server to receive a section of data stored in the storage server and assigned by the management server, to scan the section of data, to collect information regarding files stored by the storage server and to summarize the collected information into a summary, wherein the agent is an independent processing system which is a separate device from the management server and the storage server and which communicates with the storage server via a network; and
- storing the summary into a database for retrieval by the management server.

28. The method of claim 27 further comprising using the agent in place of the management server to analyze the files and generate statistics regarding the files.

29. The method of claim 27, wherein the management server comprises a multi-appliance monitoring application (MMA).

30. The method of claim 1, the agent, the storage server and the MMA communicate over one or more networks.

31. A method comprising:
- distributing a plurality of agent devices over one or more networks;
- collecting, by the agent devices, information about a plurality of sections of data maintained by one or more storage servers over the one or more networks, wherein the plurality of sections of data is assigned by a multi-appliance management application (MMA) to the agent devices;
- summarizing, by the agent devices, the collected information; and
- sending the summarized information from the agent devices to the MMA, wherein each of the agent devices, the MMA, and the one or more storage servers are separate devices, and wherein each of the agent devices is an independent processing system.

32. The method of claim 31, wherein the agent devices, while collecting the information from the storage servers, use a file system that the storage servers do not use Ibr maintaining the files.

33. The method of claim 31, wherein one or more of the agent devices uses a File system different from a file system that one or more of the other agents use.

34. A system comprising:
- a multi-appliance management application (MMA) to manage one or more storage servers over one or more networks and divide data stored in the one or more storage servers into a plurality of sections; and
- a plurality of agents distributed over the one or more networks, the plurality of agents collecting information about the plurality of sections via a network and sending the collective information to the MMA, wherein each of the plurality of agents, the MMA, and the one or more storage servers are separate devices, and wherein each of the agent devices is an independent processing system.

35. The system of claim 34, wherein one or more of the plurality of agents, while collecting information from the one or more storage servers, use a filesystem that the one or more storage servers do not use for maintaining the files.

36. The system of claim 34, wherein one or more of the plurality of agents uses a filesystem different from a filesystem that the one or more of the other agents use.

* * * * *